United States Patent
Hamada

(10) Patent No.: US 8,581,992 B2
(45) Date of Patent: Nov. 12, 2013

(54) IMAGE CAPTURING APPARATUS AND CAMERA SHAKE CORRECTION METHOD, AND COMPUTER-READABLE MEDIUM

(75) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 412 days.

(21) Appl. No.: 13/107,136

(22) Filed: May 13, 2011

(65) Prior Publication Data
US 2011/0279693 A1  Nov. 17, 2011

(30) Foreign Application Priority Data

May 14, 2010 (JP) ................................ P2010-111580
May 14, 2010 (JP) ................................ P2010-111581

(51) Int. Cl.
- *H04N 5/228* (2006.01)
- *H04N 9/73* (2006.01)
- *H04N 5/235* (2006.01)
- *G06K 9/64* (2006.01)

(52) U.S. Cl.
USPC ................. 348/208.4; 348/362; 348/223.1; 382/279

(58) Field of Classification Search
USPC .......... 348/208.4, 208.6, 208.13, 277, 223.1, 348/229.1, 362, 297; 382/276, 279
See application file for complete search history.

(56) References Cited

U.S. PATENT DOCUMENTS

| | | | |
|---|---|---|---|
| 8,314,873 B2 * | 11/2012 | Border et al. | 348/311 |
| 8,514,289 B2 * | 8/2013 | Jang | 348/208.4 |
| 2006/0158523 A1 | 7/2006 | Estevez et al. | |
| 2006/0170780 A1 | 8/2006 | Turley et al. | |
| 2010/0053346 A1 * | 3/2010 | Mitsunaga | 348/208.6 |
| 2011/0063460 A1 * | 3/2011 | Tokui | 348/208.4 |
| 2011/0075010 A1 * | 3/2011 | Border et al. | 348/362 |
| 2011/0157383 A1 * | 6/2011 | Jang | 348/208.6 |

FOREIGN PATENT DOCUMENTS

JP   11-252445 A   9/1999

OTHER PUBLICATIONS

Extended European Search Report (EESR) dated Apr. 18, 2013 (in English) issued in counterpart European Application No. 11165776.3.
Lu Yuan et al., "Image Deblurring with Blurred/Noisy Image Pairs", ACM Transactions on Graphics, vol. 26, No. 3, Article 1, Jul. 2007, pp. 1-10 (in English).

* cited by examiner

*Primary Examiner* — Nhan T Tran
(74) *Attorney, Agent, or Firm* — Holtz, Holtz, Goodman & Chick, PC

(57) ABSTRACT

An image capturing apparatus includes: an image capturing unit capturing an image of an object; an image capture controller that causes the image capturing unit to capture first color component images having a first color component by multi-shot exposure, and causes the image capturing unit to capture second and third color component images, a displacement information acquiring unit that acquires displacement information; an image adding unit that aligns and adds the first color component images based on the displacement information to generate an added image; a calculator that calculates a first point spread function based on the displacement information; a first correcting unit that corrects the second and third color component images using the first point spread function; and a combining unit that combines the added image with the corrected second and third color component images.

8 Claims, 9 Drawing Sheets

IMAGE CAPTURING APPARATUS AND CAMERA SHAKE CORRECTION METHOD, AND COMPUTER-READABLE MEDIUM

BACKGROUND

1. Field of the Invention

The present disclosure relates to camera shake correction techniques suitable for use in image capturing apparatuses such as digital still cameras.

2. Description of the Related Art

As a method for correcting camera shake when exposure is performed for a long time, e.g., when image capture is performed in a dark place, for a digital still camera, a method that uses an image signal processing technique has been known.

For example, Japanese Unexamined Patent Application Publication No. 11-252445 discloses that a plurality of images are acquired in a time-division manner within an exposure time at the time of image capture, a motion vector for a temporally previous image is detected for each of the images, and each image position is superimposed and added based on the detected motion vector so that each inter-image positional deviation is cancelled.

With the above-described method, an image in which motion blur induced by camera shake at the time of image capture is reduced can be obtained. Hereinafter, the above-described camera shake correction method will be referred to as a "method of superimposing and combining continuously captured images".

However, in the method of superimposing and combining continuously captured images, an exposure time for each of continuously captured images is reduced, and the proportion of noise included in an image capture signal read from an image capturing device is increased when the amount of light for an object is insufficient. Therefore, although motion blur can be reduced in the captured image, the foregoing method presents a problem that the total amount of noise is increased and an S/N ratio is reduced as compared with an image captured by a normal one-shot exposure, resulting in degradation in image quality of a dark region in particular.

Further, in order to prevent degradation in image quality of a dark region, the number of images acquired in a time-division manner may be reduced and a multi-shot exposure time may be increased. However, in that case, motion blur occurs in each of continuously captured images. Moreover, when motion blur has occurred, alignment accuracy in superimposing and adding a plurality of continuously captured images is also degraded. Accordingly, there arises a problem that sufficient camera shake correction cannot be performed.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to simultaneously realize an improvement in image quality of a captured image in a dark region, and high accuracy camera shake correction.

According to one or more illustrative aspects of the present invention, there is provided an image capturing apparatus. The apparatus includes: an image capturing apparatus including: an image capturing unit configured to capture an image of an object; an image capture controller configured to: (i) cause the image capturing unit to capture a plurality of first color component images of the object by multi-shot exposure within a given exposure time at the time of image shooting, wherein each of the first color component images has a first color component; and (ii) causing the image capturing unit to capture a second color component image of the object and a third color component image of the object by a one-shot exposure within the given exposure time, wherein the second color component image and the third color component image have color components different from the first color component, respectively; a displacement information acquiring unit configured to: (i) set one of the first color component images as a reference image; and (ii) acquire displacement information of the object in the first color component images other than the reference image, with respect to the object in the reference image; an image adding unit configured to align and add the first color component images based on the displacement information so as to generate an added image; a calculator configured to calculate a first point spread function (PSF) based on the displacement information; a first correcting unit configured to correct the second and third color component images using the first point spread function; and a combining unit configured to combine the added image with the corrected second and third color component images.

According to one or more illustrative aspects of the present invention, the apparatus further includes: a second correcting unit configured to: (i) estimate second point spread functions (PSF) for the first color component images, wherein each of the second point spread functions represents a trace of motion blur induced by camera shake at the time of image shooting; and (ii) correct each of the first color component images using the second the point spread functions. The calculator is configured to calculate a new first point spread function (PSF) for the second and third color component images, based on the displacement information and the second point spread functions, wherein the new first point spread function represents a trace of motion blur induced by camera shake at the time of the image shooting.

According to one or more illustrative aspects of the present invention, the apparatus further includes: a color information acquiring unit configured to acquire color information of the object; and a setting unit configured to select the first color component based on the color information. Each of the first color component images has the first color component selected by the setting unit.

According to one or more illustrative aspects of the present invention, the apparatus further includes: a determining unit configured to determine a type of a light source in an image shooting environment based on the color information. The setting unit is configured to select the first color component in accordance with the type of the light source.

According to one or more illustrative aspects of the present invention, the first color component is dominant in the color information of the object.

According to one or more illustrative aspects of the present invention, the image capturing unit is a single-plate solid-state image sensing device including: a plurality of first photoelectric conversion elements each having the first color component; a plurality of second photoelectric conversion elements each having the second color component; and a plurality of third photoelectric conversion elements each having the third color component. The image capture controller is configured to: (i) cause the plurality of first photoelectric conversion elements to capture the first color component images of the object by the multi-shot exposure within the given exposure time at the time of image shooting; (ii) cause the plurality of second photoelectric conversion elements to capture the second color component image of the object by the one-shot exposure within the given exposure time; and (iii) cause the plurality of third photoelectric conversion elements to capture the third color component image of the object by the one-shot exposure within the given exposure time.

According to one or more illustrative aspects of the present invention, there is provided a camera shake correction method. The correction method includes: (a) capturing an image of an object; (b) capturing a plurality of first color component images of the object by multi-shot exposure within a given exposure time at the time of image shooting, wherein each of the first color component images has a first color component; (c) capturing a second color component image of the object and a third color component image of the object by a one-shot exposure within the given exposure time, wherein the second and third color component images have color components different from the first color component, respectively; (d) setting one of the first color component images as a reference image; (e) acquiring displacement information of the object in the first color component images other than the reference image, with respect to the object in the reference image; (f) aligning and adding the first color component images based on the displacement information so as to generate an added image; (g) calculating a first point spread function (PSF) based on the displacement information; (h) correcting the second and third color component images using the first point spread function; and (i) combining the added image with the corrected second and third color component images.

According to one or more illustrative aspects of the present invention, there is provided a computer-readable medium storing a program for causing the computer to perform operations. The operations include: (a) capturing an image of an object; (b) capturing a plurality of first color component images of the object by multi-shot exposure within a given exposure time at the time of image shooting, wherein each of the first color component images has a first color component; (c) capturing a second color component image of the object and a third color component image of the object by a one-shot exposure within the given exposure time, wherein the second and third color component images have color components different from the first color component, respectively; (d) setting one of the first color component images as a reference image; (e) acquiring displacement information of the object in the first color component images excluding the reference image, with respect to the object in the reference image; (f) aligning and adding the first color component images based on the displacement information so as to generate an added image; (g) calculating a first point spread function (PSF) based on the displacement information; (h) correcting the second and third color component images using the first point spread function; and (i) combining the added image with the corrected second and third color component images.

DESCRIPTION OF EXEMPLARY EMBODIMENTS

First Embodiment

Hereinafter, a first embodiment of the present invention will be now described with reference to the drawings.

Figure 1:
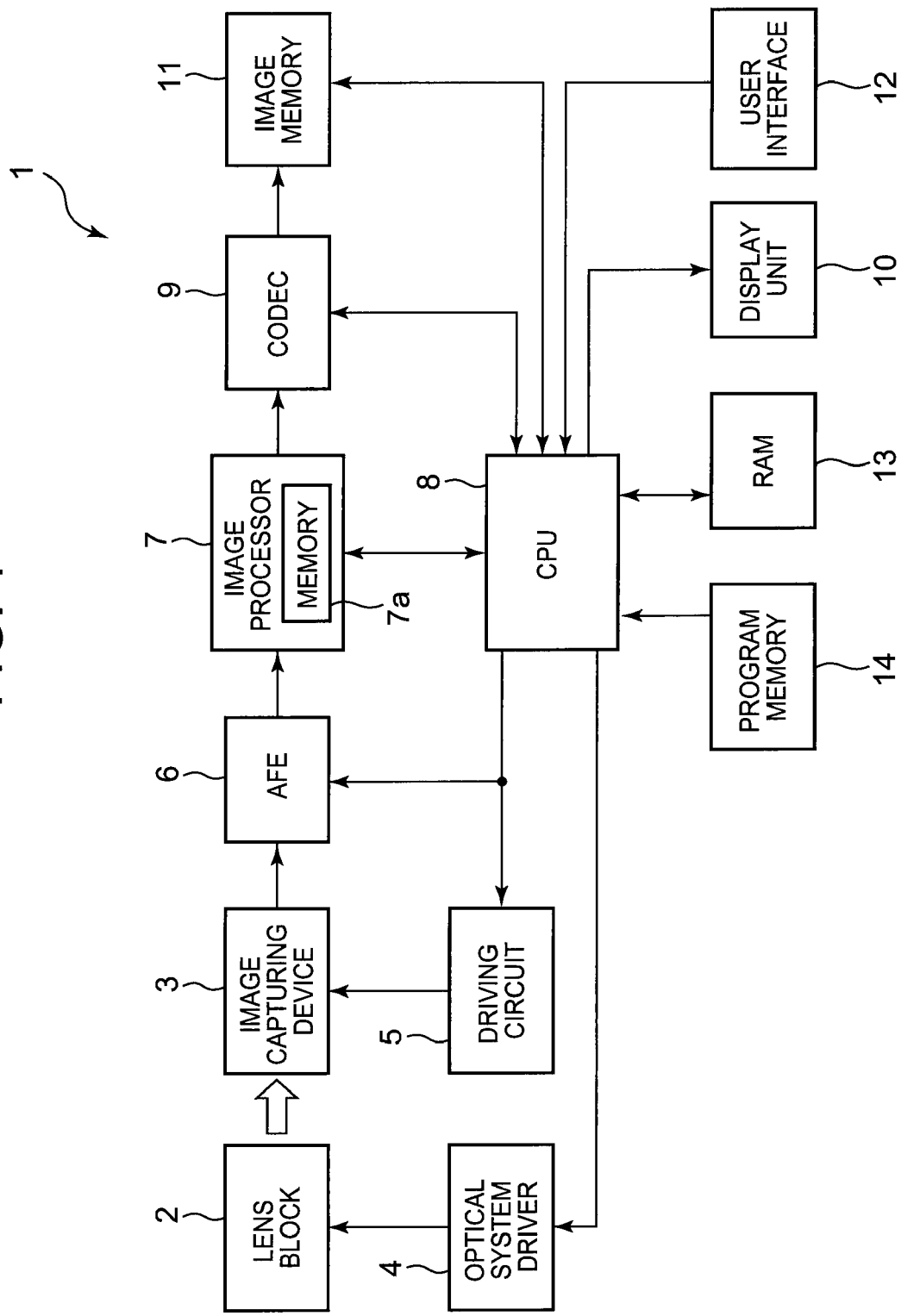
FIG. 1 is a block diagram illustrating an electrical configuration of a digital still camera according to an embodiment of the present invention.

FIG. 1 is a block diagram illustrating general outlines of an electrical configuration of a digital still camera 1 according to an embodiment of the present invention.

The digital still camera 1 has a lens block 2 and an image capturing device 3.

The lens block 2 includes: a lens group including a focus lens; an iris; a lens motor for driving the lens group; and an actuator for driving the iris so that the iris is opened/closed.

The lens motor and the actuator are driven by an optical system driver 4, thereby adjusting a focal position and the amount of light received by the image capturing device 3.

The image capturing device 3 is a CMOS (Complementary Metal Oxide Semiconductor) sensor provided at its light-sensitive surface with a Bayer pattern color filter.

Specifically, the image capturing device 3 is a solid-state image capturing device that can read, as necessary, pixel signals of three primary color components, i.e., R (Red), G (Green) and B (Blue), individually for each color component.

At the same time, a group of photoelectric conversion elements (hereinafter referred to as "pixels") of the image capturing device 3 is provided with a color filter of a particular color.

The image capturing device 3 performs photoelectric conversion on an optical image of an object by being driven by a driving circuit 5, and outputs, to an AFE (Analog Front End) 6, an electric signal, i.e., an image capture signal, responsive to the converted optical image.

The AFE 6 includes a CDS (Correlated Double Sampling) circuit, a PGA (Programmable Gain Amp), an ADC (Analog-to-Digital Converter) and the like.

The AFE 6 performs given analog processing on the image capture signal outputted from the image capturing device 3, converts the image capture signal, on which the analog processing has been performed, into a digital signal, and then outputs pixel data of the converted image to an image processor 7.

The image processor 7 has a buffer memory 7a for temporarily storing the pixel data received from the AFE 6.

The pixel data temporarily stored in the memory 7a is Bayer pattern pixel data in which pixels have color components corresponding to a color pattern of the color filter.

Furthermore, in the memory 7a, image pixel data for each of RGB color components is also temporarily stored as necessary.

The image pixel data for each of RGB color components, which has been temporarily stored in the memory 7a, is combined as Bayer pattern pixel data by a CPU 8, and is then temporarily stored in the memory 7a again.

Note that a memory capacity by which pixel data for a plurality of frames is storable is ensured in the memory 7a.

The image processor 7 performs various image processing on the pixel data (Bayer pattern pixel data), temporarily stored in the memory 7a, with the aim of storing images captured by the image capturing device 3.

The image processing performed by the image processor 7 includes gamma correction, white balance adjustment, generation of R, G and B color component data for each pixel, and YUV conversion for generating YUV data from the generated RGB data.

Moreover, the image processor 7 supplies the generated YUV data for one frame to the CPU 8 while the digital still camera 1 is in an image capture standby state, and supplies the generated YUV data for one frame to a CODEC (Coder/Decoder) 9 at the time of image capture.

The YUV data, supplied to the CPU 8 while the digital still camera 1 is in the image capture standby state, is supplied to a display unit 10 and displayed as a live view image on the display unit 10.

The display unit 10 includes: a liquid crystal display for displaying an image such as a live view image; and a circuit such as a driving circuit for driving the liquid crystal display.

The CODEC 9 encodes the image data (YUV data), supplied from the image processor 7 at the time of image capture, by using a JPEG format, and decodes any given image data that is encoded.

Although not illustrated, the CODEC 9 includes an orthogonal conversion circuit, a quantizing circuit, a motion detection circuit, a forward prediction circuit, an encoding circuit, a decoding circuit, an inverse orthogonal conversion circuit and a frame memory for encoding and decoding image data.

The CPU 8 adds various pieces of image capture information such as date information and image size to the image data compressed and encoded in a JPEG format by the CODEC 9 at the time of image capture, and then records the resulting data as still image data (still image file) in an image memory 11.

The image memory 11 is a flash memory incorporated into a camera main body or various memory cards attachable to and detachable from the camera main body, for example.

The still image data stored in the image memory 11 is read by the CPU 8 as appropriate at the time of reproduction, decoded by the CODEC 9, and then sent to the display unit 10 so as to be reproduced as a still image.

Further, the CPU 8 is connected with a user interface 12, a RAM (Random Access Memory) 13, and a program memory 14.

The RAM 13 is a working memory for the CPU 8.

The user interface 12 includes a plurality of unillustrated keys such as a power key, a shutter key, a mode switching key, a MENU key, and a direction (arrow) key.

The mode switching key allows switching between an image capture mode that is a basic operational mode of the digital still camera 1, and a reproduction mode for display of a recorded image.

The MENU key is used to perform various setting works such as settings for lower modes of the image capture mode.

An operating state of each key of the user interface 12 is scanned by the CPU 8 on an as needed basis.

The shutter key is formed to have a so-called "half shutter function" which enables two-stage operations including a half-pressing operation and a fully pressing operation.

The shutter key half-pressing operation is used to provide, for example, an instruction for start of an AE (Auto Exposure) operation and an AF (Auto Focus) operation, and the shutter key fully pressing operation is used to provide an instruction for image capture.

The program memory 14 is stored in a flash memory that is an EEPROM (Electric Erasable Programmable Read Only Memory) in which stored data is rewritable, for example.

The program memory 14 stores a control program and various data for allowing the CPU 8 to control operations of the entire digital still camera 1.

The control program stored in the program memory 14 includes a program for allowing the CPU 8 to carry out AE control, AF control and AWB (Auto White Balance) control.

Furthermore, the various data stored in the program memory 14 include program AE data constituting a program diagram indicating a combination of: an F number corresponding to appropriate exposure at the time of image capture; and a shutter speed.

The CPU 8 allows the RAM 13 to operate as a working memory in accordance with the control program stored in the program memory 14, and thus controls each unit of the digital still camera 1.

Moreover, when a camera-shake-induced motion blur correction mode, which will be described later, is set, the CPU 8 functions as an image capture controller, a displacement information acquiring unit, an image adding unit, a calculator, a correcting unit, a combining unit, a color information acquiring unit, a setting unit, and a determining unit according to the present invention.

Next, operations of the digital still camera 1 according to the present invention, having the above-described configuration, will be now described.

The camera-shake-induced motion blur correction mode is provided as a lower mode of the image capture mode in the digital still camera 1.

The camera-shake-induced motion blur correction mode is the lower mode of the image capture mode, which is prepared in advance in the digital still camera 1 with the aim of reducing motion blur induced by camera shake at the time of image capture and generated in a captured image.

In the digital still camera 1, the CPU 8 allows the image capturing device 3 to be driven at a given frame rate while the image capture mode is set.

The CPU 8 allows the display unit 10 to sequentially display, as live view images, images of an object captured by the image capturing device 3.

Figure 2:
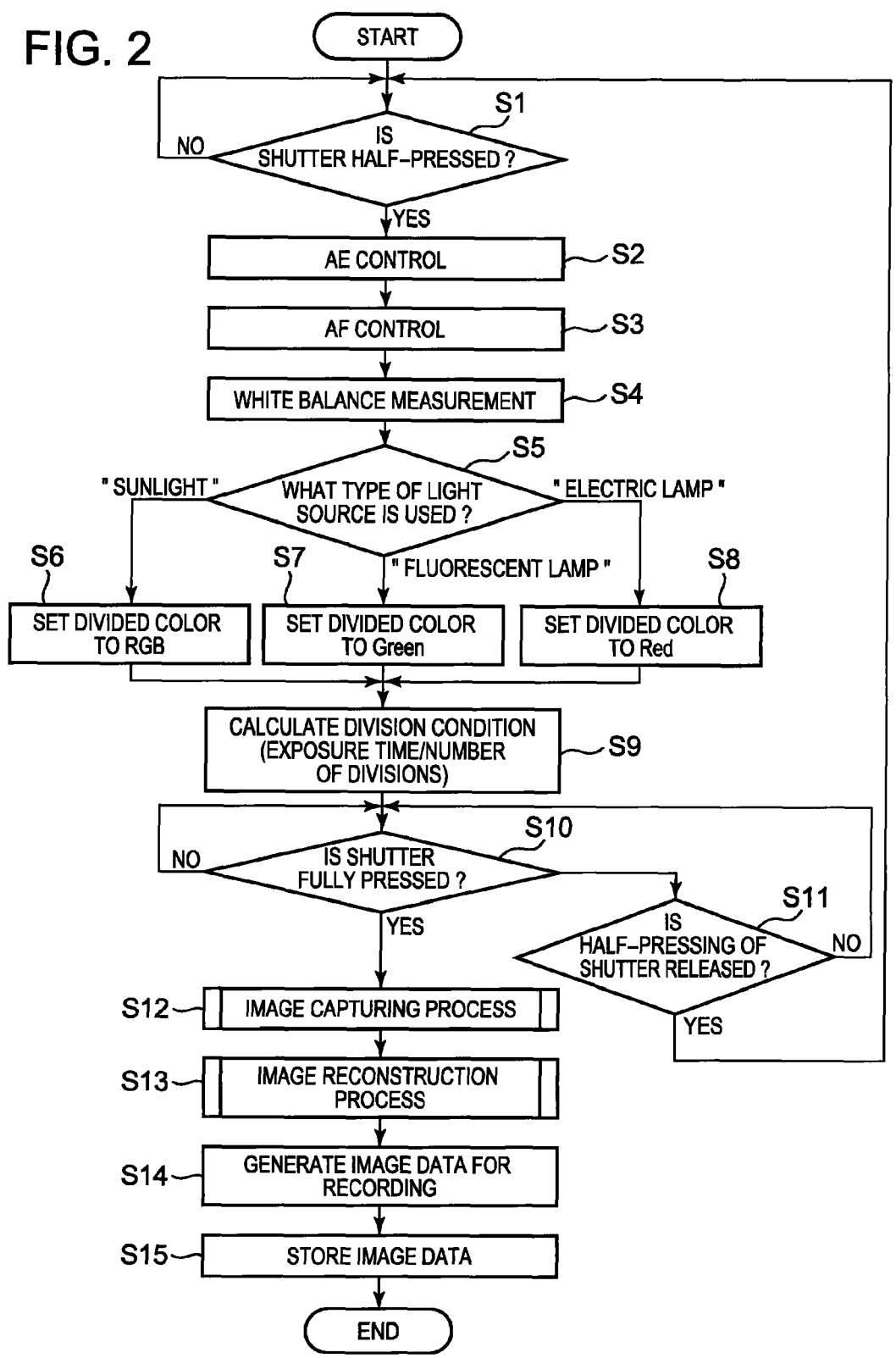
FIG. 2 is a flow chart illustrating how processing is performed by a CPU when a camera-shake-induced motion blur correction mode is set.

FIG. 2 is a flow chart illustrating how processing is carried out by the CPU 8 in accordance with the control program stored in the program memory 14 when the camera-shake-induced motion blur correction mode is set.

The CPU 8 sequentially detects whether or not the shutter key half-pressing operation is performed by a user while a through image is displayed on the display unit 10.

Upon detection of the shutter key half-pressing operation (Step S1: YES), the CPU 8 determines the f number at the time of image capture and an exposure time (shutter speed) by AE control (Step S2).

Besides, the CPU 8 brings the main object into focus by AF control (Step S3).

Note that the AF control carried out by the CPU 8 is a known contrast detection method.

Next, the CPU 8 performs white balance measurement (Step S4).

The white balance measurement is a process for acquiring spectral distribution data indicating a state of distribution of the number of pixels for each color temperature based on color component information (RGB values) in the image data of the object captured by the image capturing device 3 immediately before the shutter key is half-pressed, for example.

Subsequently, the CPU 8 determines the type of the current light source based on the spectral distribution data acquired by the white balance measurement (Step S5).

The CPU 8 determines the light source type as one of the following three types: sunlight; a fluorescent lamp; an electric lamp (incandescent lamp).

When sunlight has been determined as the light source type (Step S5: "SUNLIGHT"), the CPU 8 sets divided color to "RGB", i.e., all color components (Step S6).

Further, when a fluorescent lamp has been determined as the light source type (Step S5: "FLUORESCENT LAMP"), the CPU 8 sets the divided color to "Green" (Step S7).

Furthermore, when an electric lamp (incandescent lamp) has been determined as the light source type (Step S5: "ELECTRIC LAMP"), the CPU 8 sets the divided color to "Red" (Step S8).

The divided color set by the CPU 8 in each of the processes of Steps S7 and S8 is a particular color component for which a pixel signal should be read from the image capturing device 3 by a multi-shot exposure in an after-mentioned image capturing process, and is associated with a first color component according to the present invention.

In addition, the CPU 8 uses the light source type, which has been determined in Step S5, not only for the divided color setting process but also for white balance adjustment performed by AWB control.

In other words, the CPU 8 allows the image processor 7 to perform white balance adjustment in accordance with the light source type determined in Step S5.

Subsequently, the CPU 8 calculates a division condition for the set divided color (Step S9).

The division condition is the number of divisions for a group of pixels (photoelectric conversion elements), to which the divided color is allocated, when a pixel signal of the divided color set in the process of Step S6, S7 or S8 is read by the multi-shot exposure at the time of the after-mentioned image capturing process.

In the process of Step S9, the CPU 8 divides the exposure time determined by AE control in Step S2 by the number of divisions (the number of exposures), thereby obtaining a single exposure time.

Thereafter, the CPU 8 detects whether or not shutter key fully pressing is performed, and upon detection of no shutter key fully pressing (Step S10: NO), the CPU 8 further detects whether or not shutter key half-pressing is released (Step S11).

Then, upon detection of the release of shutter key half-pressing (Step S11: YES), the CPU 8 returns the processing to Step S1 and repeats the foregoing processes subsequent to Step S1.

On the other hand, upon detection of shutter key fully pressing (Step S10: YES), the CPU 8 immediately carries out the image capturing process (Step S12).

In the image capturing process, the CPU 8 allows the driving circuit 5 to generate a given driving signal corresponding to the previously set divided color and the division condition calculated in the process of Step S9 so as to drive the image capturing device 3, thus carrying out the following steps.

Figure 3:
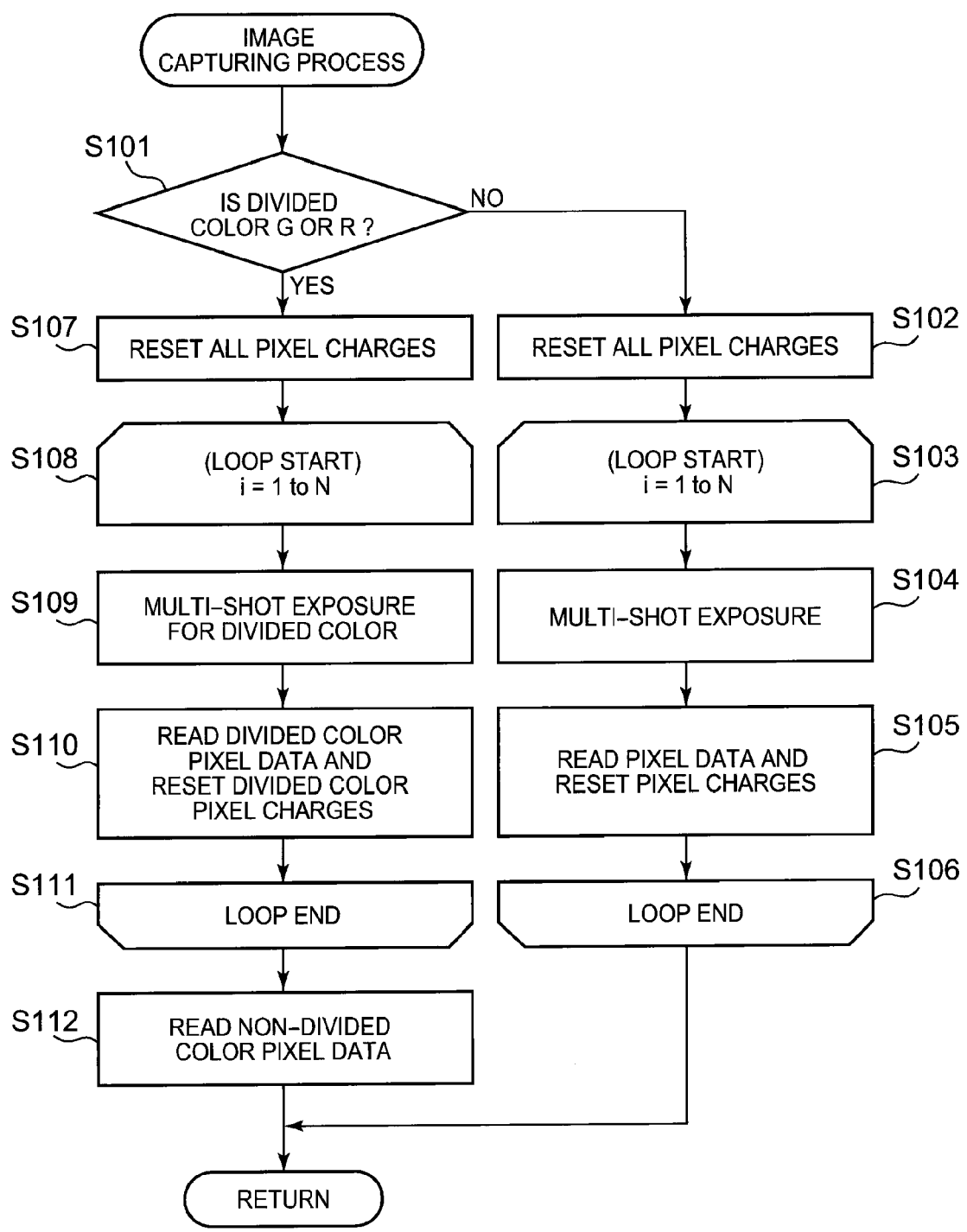
FIG. 3 is a flow chart illustrating how an image capturing process is performed by the CPU.

As illustrated in FIG. 3, when the divided color is neither "Green" nor "Red" but is "RGB" (Step S101: NO), the CPU 8 resets accumulated charges (pixel charges) for all pixels of the image capturing device 3 (Step S102).

Thereafter, until a loop counter i reaches the number of divisions N determined in advance, a loop process of Steps S103 to S106 is carried out.

In this loop process, for all pixels of the image capturing device 3, the CPU 8 repeatedly carries out exposure for the multi-shot exposure time calculated in Step S9 (Step S104), and reading of pixel data after the multi-shot exposure and resetting of pixel charges (Step S105).

Thus, the CPU 8 allows the memory 7a of the image processor 7 to temporarily store the pixel data of divided color pixels, the number of which is equal to the number of divisions N.

In this embodiment, the pixel data of the divided color pixels, temporarily stored in the memory 7a, is Bayer pattern pixel data including all of RGB color components.

Then, the CPU 8 ends the image capturing process upon end of the above-described loop process, and returns the processing to the step in FIG. 2.

On the other hand, when the divided color is "Green" or "Red" (Step S101: YES), the CPU 8 resets the accumulated charges (pixel charges) for all pixels of the image capturing device 3 (Step S107).

Thereafter, until the loop counter i reaches the number of divisions N determined in advance, a loop process of Steps S108 to S111 is carried out.

In this loop process, for a group of pixels of the image capturing device 3, to which the divided color is allocated, the CPU 8 repeatedly carries out exposure for the multi-shot exposure time calculated in Step S9 (Step S109), and reading of pixel data after the multi-shot exposure and resetting of pixel charges (Step S110).

Further, in parallel with the above-described loop process, the CPU 8 performs, for a group of pixels of the image capturing device 3, to which non-divided color other than the divided color is allocated, one-shot exposure for the exposure time set by AE control (note that this operation is not illustrated in the flow chart).

Then, immediately after the end of the foregoing loop process, pixel data of the non-divided color is read (Step S112).

The non-divided color other than the divided color is a color corresponding to a second color component according to the present invention.

Thus, the CPU 8 allows the memory 7a of the image processor 7 to temporarily store: pixel data of divided color pixels, which is captured by the multi-shot exposure and the number of which is equal to the number of divisions N; and pixel data of two types of non-divided colors, which is captured by the one-shot exposure and each of which includes a color component of the non-divided color.

In other words, when the divided color is set to "Green" by the CPU 8, the memory 7a temporarily stores: a plurality of pieces of divided color pixel data including G components; non-divided color pixel data including an R component; and non-divided color pixel data including a B component.

On the other hand, when the divided color is set to "Red" by the CPU 8, the memory 7a temporarily stores: a plurality of pieces of divided color pixel data including R components; non-divided color pixel data including a G component; and non-divided color pixel data including a B component.

Then, upon end of the step of reading the pixel data of the two types of non-divided colors, the CPU 8 ends the image capturing process and returns the processing to the step in FIG. 2.

After the end of the above-described image capturing process, the CPU 8 carries out a process for reconstructing each piece of pixel data temporarily stored in the memory 7a of the image processor 7 (Step S13).

Figure 4:
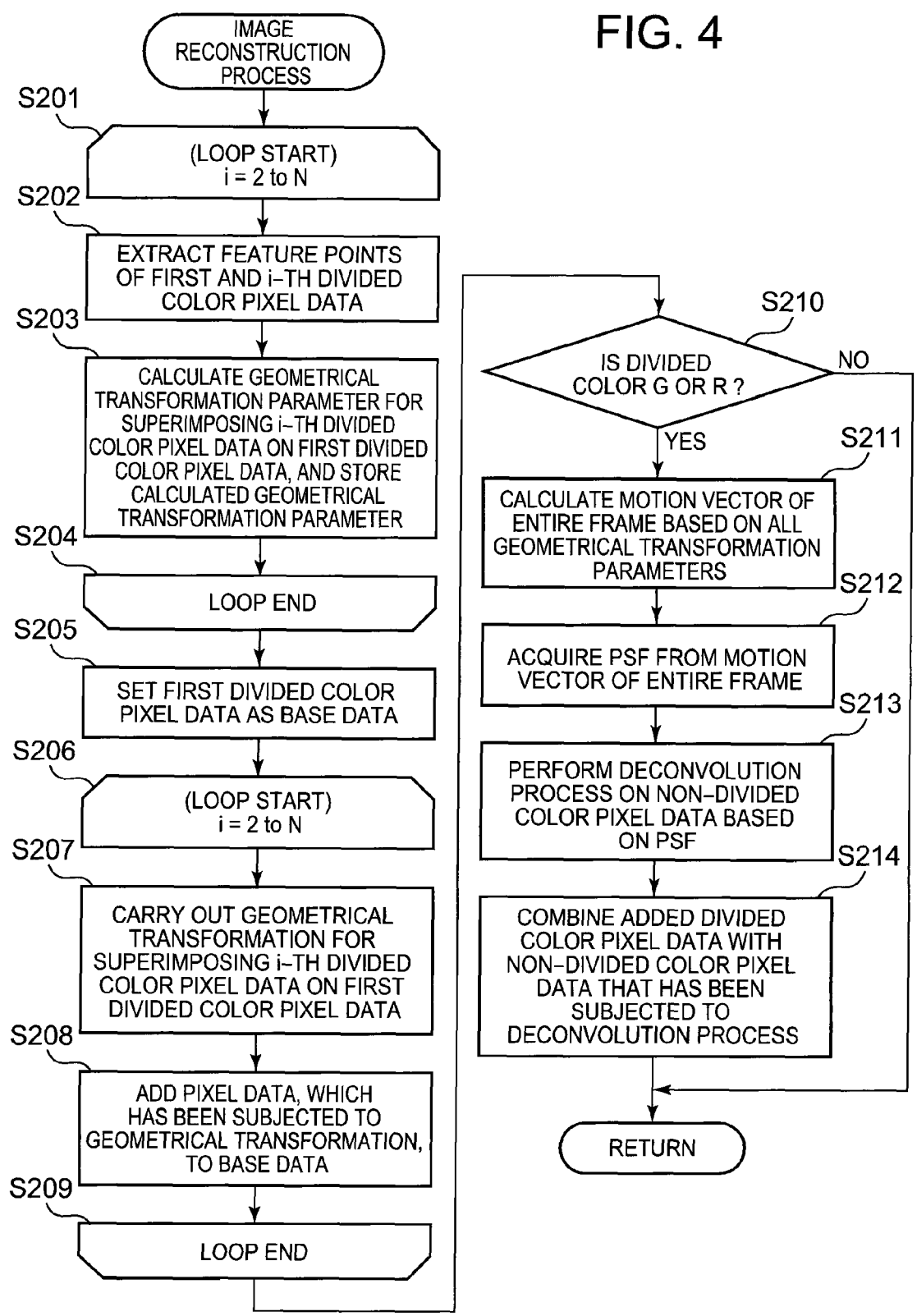
FIG. 4 is a flow chart illustrating how an image reconstruction process is performed by the CPU.

FIG. 4 is a flow chart illustrating how the process for reconstructing each piece of pixel data is carried out by the CPU 8.

Note that the CPU 8 has set the divided color by determining the light source type by the white balance measurement (Step S4); however, from the color component information (RGB values), a dominant color for which the RGB value in the image is high may be simply set as the divided color.

In the image reconstruction process, the CPU 8 first carries out a loop process of Steps S201 to S204.

In this loop process, an initial value of the loop counter i is set to "2", and the loop process is performed until the loop counter i reaches the number of divisions N determined in advance.

In this loop process, for a plurality of pieces of divided color pixel data, the CPU 8 first extracts a plurality of corresponding feature points between the first divided color pixel data and the i-th divided color pixel data, e.g., the second or subsequent divided color pixel data (Step S202).

Note that as already described above, a plurality of pieces of divided color pixel data to be processed are Bayer pattern pixel data when the divided color is "RGB"; on the other hand, a plurality of pieces of divided color pixel data to be processed are pixel data including only G components or R components as color components when the divided color is "Green" or "Red".

Moreover, the CPU 8 calculates a geometrical transformation parameter necessary for superimposition of the i-th divided color pixel data on the first divided color pixel data, and stores the calculated geometrical transformation parameter in the RAM 13 (Step S203).

The geometrical transformation parameter is displacement information indicative of displacement of the object, represented by the i-th divided color pixel data and relative to the first divided color pixel data.

Specifically, the geometrical transformation parameter is a determinant necessary for geometrical transformation (coordinate transformation) by which coordinate positions of a plurality of the feature points of the i-th divided color pixel data are matched with those of a plurality of the corresponding feature points of the first divided color pixel data.

Note that the CPU 8 calculates the geometrical transformation parameter by optical flow estimation using a known gradient method, for example.

After the end of the above-described loop process, the CPU 8 sets the first divided color pixel data as base data for an adding process of Step S208, which will be described later, and stores the base data in the RAM 13 (Step S205).

Subsequently, the CPU 8 carries out a new loop process of Steps S206 to S209.

Also in this loop process, an initial value of the loop counter i is set to "2", and the loop process is performed until the loop counter i reaches the number of divisions N determined in advance.

In this loop process, using the geometrical transformation parameter stored in Step S203, the CPU 8 first carries out geometrical transformation for superimposing the i-th divided color pixel data (second or subsequent divided color pixel data) on the first divided color pixel data (Step S207).

Next, the CPU 8 adds the i-th divided color pixel data (second or subsequent divided color pixel data), which has been subjected to geometrical transformation, to the base data stored in the RAM 13, thus updating the base data (Step S208).

As a result of the above-described loop process, a plurality of pieces of the divided color pixel data are added while positional deviations of the object, represented by the divided color pixel data, are sequentially corrected, and the pixel data of the added image after the addition is stored in the RAM 13.

In other words, a plurality of pieces of the divided color pixel data are combined by the method similar to the method of superimposing and combining continuously captured images, which has been described in the background of the present invention, thus generating new divided color pixel data in which motion blur induced by camera shake within the exposure time is reduced.

Then, when the divided color is "RGB" (Step S210: NO), the CPU 8 ends the image reconstruction process at this point.

On the other hand, when the divided color is "Green" or "Red" (Step S210: YES), the CPU 8 subsequently performs the following steps.

First, the CPU 8 calculates a motion vector of an entire frame based on the geometrical transformation parameters calculated in the process of Step S203 (Step S211).

The motion vector of the entire frame is a motion vector indicative of a trace of camera shake that occurs within the exposure time.

In the present embodiment, camera shake that occurs within the exposure time is a parallel movement, and the motion vector of the entire frame is calculated on the assumption that no significant rotation occurs.

Thereafter, the CPU 8 acquires a PSF (Point Spread Function) from the calculated motion vector of the entire frame (Step S212).

Hereinafter, details of the motion vector of the entire frame and the PSF will be described with reference to FIGS. 5A to 5D.

Figure 5A:
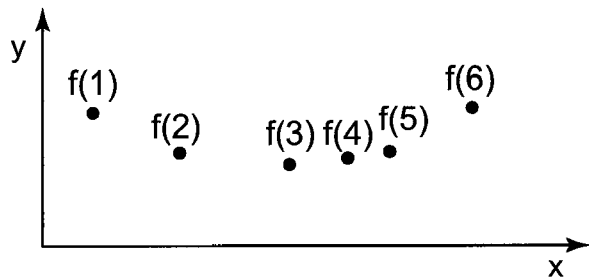
FIGS. 5A to 5D are explanatory diagrams illustrating a motion vector of an entire frame and PSFs (Point Spread Functions)

FIG. 5A is a diagram illustrating parallel movement positions f(1) to f(6) of the respective pieces of divided color pixel data in a pixel space on the assumption that the number of exposures is six.

Figure 5B:
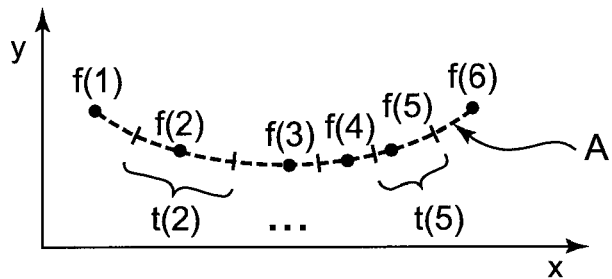

FIG. 5B is a diagram illustrating a curve A (which is a broken line in the diagram) obtained by interpolation of each of the parallel movement positions f(1) to f(6).

The curve A illustrated in FIG. 5B is a trace of camera shake, and in the process of Step S211, the CPU 8 calculates, as the motion vector of the entire frame, a motion vector indicating this curve A.

On the other hand, line segments by which the curve A is delimited in FIG. 5B are obtained by delimiting the curve A at midpoints between the parallel movement positions of the respective pieces of the divided color pixel data, so that each of the parallel movement positions f(1) to f(6) is associated with the exposure time.

Figure 5C:
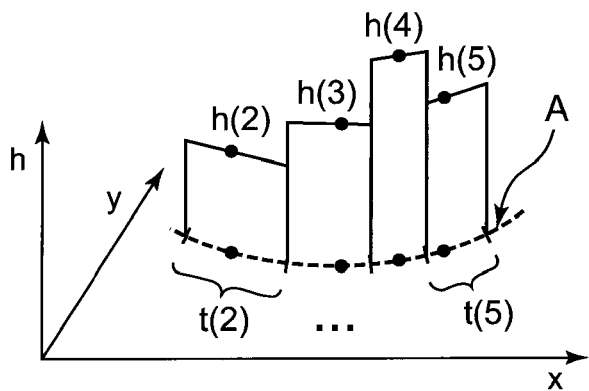

FIG. 5C illustrates weight assignment carried out so that line integrals of weights (h axis) along the curve A each provide an area equivalent to each exposure time and a total sum becomes 1 (assume that for each exposure time, a value obtained by dividing 1 by the number of frames and the length of each exposure time is determined as a weight).

Weights h(2) to h(5), defined with respect to coordinates (x, y) of the respective parallel movement positions f(1) to f(6), provide a PSF.

Figure 5D:
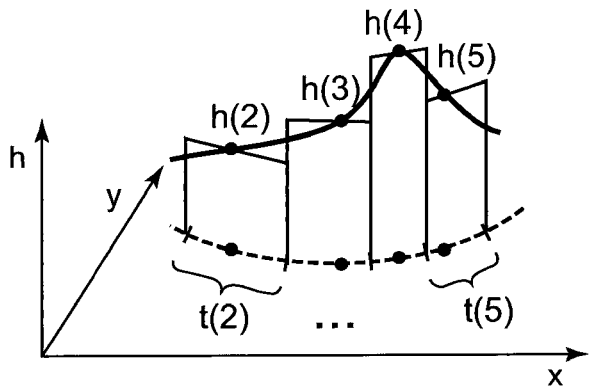

Further, FIG. 5D is a diagram illustrating the PSF (indicated by a thick line in the diagram) by which the respective weights h(2) to h(5) become smooth continuous values, and in the process of Step S212, the CPU 8 calculates the PSF.

Note that the case where the PSF is acquired with the exclusion of the first and last divided color pixel data is illustrated in FIGS. 5C and 5D for the sake of convenience; however, in the process of Step S212, the CPU 8 calculates the PSF by using all pieces of the divided color pixel data.

Specifically, in calculating the PSF, the CPU 8 performs half-frame extrapolation on the curve A from end points thereof (e.g., extends ends thereof by lengths equal to those of adjacent midpoints in the same direction as adjacent motion vectors), thereby calculating the PSF by using all pieces of the divided color pixel data.

Then, after the foregoing PSF has been acquired, the CPU 8 carries out, for the pixel data of the two types of non-divided colors, a deconvolution process in which the acquired PSF is used as a two-dimensional convolution kernel (Step S213).

The deconvolution process is a correcting process for reducing motion blur, induced by camera shake within the exposure time and generated in the non-divided color pixel data, by means of deconvolution calculation using the PSF (i.e., a convolution calculation using an inverse function of the PSF).

Thereafter, the CPU 8 combines the pixel data of the two types of the non-divided colors, which has been subjected to the deconvolution process, with the pixel data of the added image of the divided color, which has been stored in the RAM 13 as a result of the loop process of Steps S206 to S209 (Step 214).

Thus, the CPU 8 generates, in the RAM 13, Bayer pattern pixel data including all RGB color components, and ends the image reconstruction process.

Figure 6:
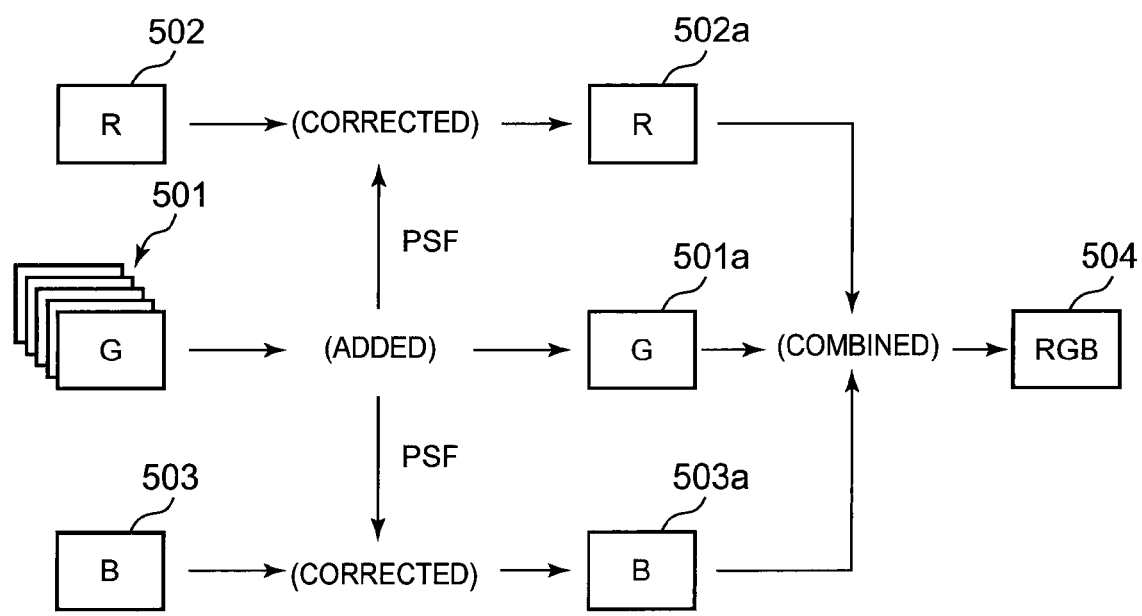
FIG. 6 is an explanatory diagram illustrating how an image reconstruction process is performed.

FIG. 6 is an explanatory diagram illustrating general outlines of the above-described image reconstruction process in an example where the divided color is "Green".

When the divided color is "Green" as illustrated in FIG. 6, a plurality of pieces of divided color pixel data 501 including only G components are added to a single piece of divided color pixel data 501a based on the geometrical transformation parameters detected for the second and subsequent divided color pixel data.

On the other hand, non-divided color pixel data 502 including only an R component and non-divided color pixel data 503 including only a B component are corrected so that the pixel data 502 and 503 become new non-divided color pixel data 502a and 503a, respectively, in which motion blur is reduced by using the PSFs acquired based on the geometrical transformation parameters.

Thereafter, the single piece of the divided color pixel data 501a on which the addition has been performed is combined with the new non-divided color pixel data 502a and 503a on which the correction has been performed, thus providing pixel data 504 similar to Bayer pattern pixel data including all RGB color components.

Then, concurrently with the end of the above-described image reconstruction process, the CPU 8 returns the processing to the step in FIG. 2 and generates image data for recording (Step S14).

In the process of Step S14, the CPU 8 supplies, to the image processor 7, the Bayer pattern pixel data stored in the RAM 13 at this point, and allows the image processor 7 to perform various image processing on this pixel data.

Thereafter, the CPU 8 compresses the image data for recording by the CODEC 9, and stores, as a still image file, the compressed image data in the image memory 11 (Step S15).

As described above, when a camera shake correction mode is set as the image capture mode in the digital still camera 1 according to the present embodiment, the CPU 8 carries out the foregoing processes, thereby enabling reduction in camera-shake-induced motion blur generated in a captured image.

Second Embodiment

Hereinafter, a second embodiment of the present invention will be described with reference to the drawings.

The description concerning FIG. 1 (which is a block diagram illustrating the general outlines of the electrical configuration of the digital still camera 1 according to the present invention), FIG. 2 (which is a flow chart illustrating how the processing is performed by the CPU when the camera shake correction mode is set) and FIG. 3 (which is a flow chart illustrating how the image capturing process is performed by the CPU) is similar to that in the first embodiment, and will therefore be omitted hereinafter.

Note that when the camera shake correction mode, which will be described later, is set, the CPU 8 functions as an image capture controller, a first correcting unit, a displacement information acquiring unit, an image adding unit, a calculator, a second correcting unit, a combining unit, a color information acquiring unit, a setting unit, and a determining unit according to the present invention.

Figure 7:
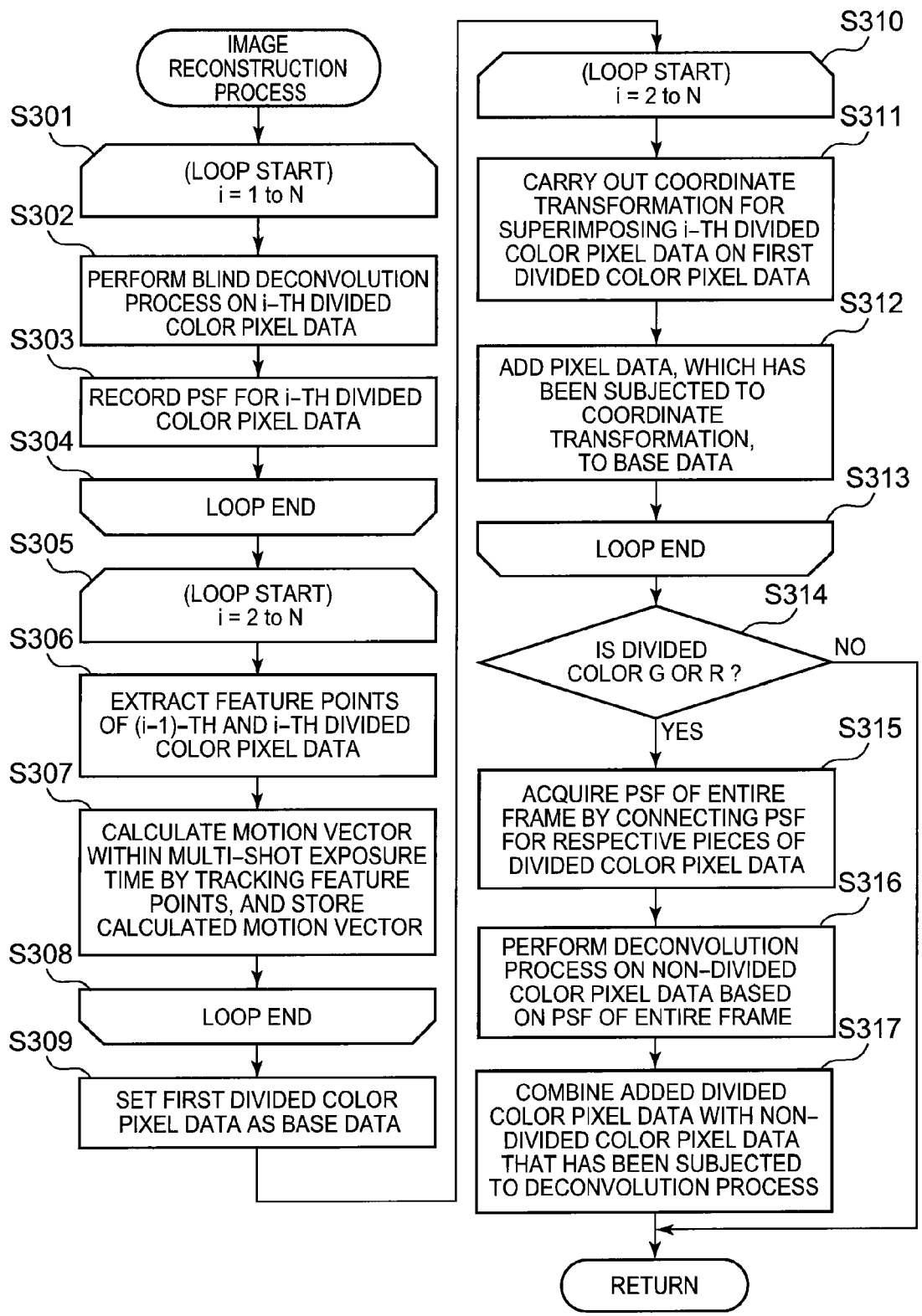
FIG. 7 is a flow chart illustrating how an image reconstruction process is performed by the CPU.

FIG. 7 is a flow chart illustrating how an image reconstruction process is performed by the CPU 8.

Note that the divided color has been set by determining the light source type by white balance measurement (Step S4); however, from color component information (RGB values), a dominant color for which the RGB value in the image is high may be simply set as the divided color.

In the image reconstruction process, the CPU 8 first carries out a loop process of Steps S301 to S304.

This loop process is performed until the loop counter i reaches the number of divisions N determined in advance.

In this loop process, for a plurality of pieces of divided color pixel data, the CPU 8 first performs a blind deconvolution process on the i-th divided color pixel data (Step S302).

Note that as already described above, a plurality of pieces of divided color pixel data to be processed are Bayer pattern pixel data when the divided color is "RGB"; on the other hand, a plurality of pieces of divided color pixel data to be processed are pixel data including only G components or R components as color components when the divided color is "Green" or "Red".

In the blind deconvolution process, a PSF (Point Spread Function) indicating motion blur included in the i-th divided color pixel data is estimated.

Specifically, the blind deconvolution process is a process for performing deconvolution calculation, i.e., deconvolution, using the estimated PSF (convolution calculation using an inverse function of the PSF).

With this process, the CPU 8 reduces (corrects) motion blur induced by camera shake within the multi-shot exposure time and generated in the i-th divided color pixel data.

As a specific method for the blind deconvolution process, any method may be applied. For example, a method disclosed in "Removing camera shake from a single photograph" (R. Fergus et al., ACM SIGGRAPH, 2006) may be applied.

Furthermore, the CPU 8 stores, in the RAM 13, the PSF for the i-th divided color pixel data, which has been estimated in the blind deconvolution process (Step S303).

Figure 8A:
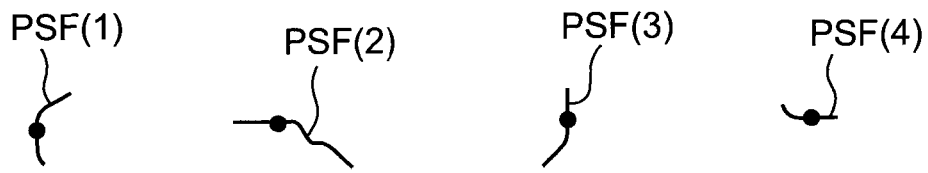
FIG. 8A is a conceptual diagram illustrating a PSF (Point Spread Function) estimated for each piece of divided color pixel data.

FIG. 8A is a conceptual diagram schematically illustrating PSFs (1) to (4) for the respective pieces of the divided color pixel data, which are stored in the RAM 13 as a result of the loop process of Steps S301 to S304, in an example where the number of divisions is four.

Note that points indicated by bullets in FIG. 8A represent original point positions of the PSFs (1) to (4).

After the end of the above-described loop process, the CPU 8 subsequently carries out a next loop process of Steps S305 to S308.

In this loop process, an initial value of the loop counter i is set to "2", and this loop process is performed until the loop counter i reaches the number of divisions N determined in advance.

In this loop process, for a plurality of pieces of divided color pixel data, the CPU 8 first extracts a plurality of corresponding feature points between the (i−1)-th divided color pixel data and the i-th divided color pixel data, e.g., the second or subsequent divided color pixel data (Step S306).

Next, the CPU 8 calculates a motion vector by tracking traces of the extracted feature points, and stores the calculated motion vector in the RAM 13 (Step S307).

The motion vector is displacement information indicative of displacement of the object at multi-shot exposure time intervals between the divided color pixel data captured in tandem by multi-shot exposure.

In the process of Step S307, the CPU 8 calculates the motion vector of the entire i-th divided color pixel data on the assumption that no significant rotation occurs.

Note that in calculating the motion vector, the feature points may be tracked in units of given blocks, or may be tracked in units of blocks close to the feature points.

Moreover, in calculating the motion vector, only a single feature point may be tracked for each piece of the divided color pixel data as long as accuracy degradation is allowed.

When the feature points are tracked in units of blocks, the motion vector, i.e., the amount of parallel movement of the divided color pixel data, is estimated by using median, RANSAC, etc.

Figure 8B:
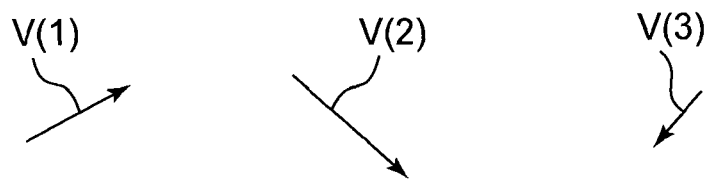
FIG. 8B is a conceptual diagram illustrating motion vectors obtained at multi-shot exposure time intervals.

FIG. 8B is a conceptual diagram schematically illustrating motion vectors V(1) to (3) obtained at multi-shot exposure time intervals, which are stored in the RAM 13 as a result of the foregoing loop process. FIG. 8B is associated with FIG. 8A.

Specifically, the motion vector V(1) indicates a parallel movement between the first divided color pixel data and the second divided color pixel data.

Further, the motion vector V(2) indicates a parallel movement between the second divided color pixel data and the third divided color pixel data.

Furthermore, the motion vector V(3) indicates a parallel movement between the third divided color pixel data and the fourth divided color pixel data.

Then, the CPU 8 ends the loop process of Steps S305 to S308.

Thereafter, the first divided color pixel data is set as base data for an adding process of Step S312, which will be described later, and the base data is stored in the RAM 13 (Step S309).

Subsequently, the CPU 8 carries out a new loop process of Steps S310 to S313.

Also in this loop process, an initial value of the loop counter i is set to "2", and the loop process is performed until the loop counter i reaches the number of divisions N determined in advance.

In this loop process, using the motion vectors obtained at multi-shot exposure time intervals and stored in Step S307, the CPU 8 first carries out coordinate transformation for superimposing the i-th divided color pixel data (second or subsequent divided color pixel data) on the base data (Step S311).

Next, the CPU 8 adds the i-th divided color pixel data (second or subsequent divided color pixel data), which has been subjected to the coordinate transformation, to the base data stored in the RAM 13, thus updating the base data (Step S312).

As a result of the above-described loop process, a plurality of pieces of the divided color pixel data are added while positional deviations of the object represented by the divided color pixel data are sequentially corrected, and the added pixel data after the addition is stored in the RAM 13.

In other words, a plurality of pieces of the divided color pixel data are combined by the method similar to the method of superimposing and combining continuously captured images, which has been described in the background of the present invention.

Thus, new divided color pixel data in which motion blur induced by camera shake within the exposure time is reduced is generated.

Then, when the divided color is "RGB" (Step S314: NO), the CPU 8 ends the image reconstruction process at this point.

On the other hand, when the divided color is "Green" or "Red" (Step S314: YES), the CPU 8 subsequently performs the following steps.

First, the CPU 8 acquires a PSF of an entire frame by connecting the PSFs for the respective pieces of the divided color pixel data, which have been previously estimated in performing the blind deconvolution process (Step S315).

In this case, the PSF of the entire frame is a new PSF indicating a trace of motion blur within the exposure time.

In the process of Step S315, the CPU 8 connects the PSFs for the respective pieces of the divided color pixel data by parallelly moving the PSFs in accordance with the motion vectors obtained at divided time intervals in the process of Step S307.

Figure 8C:
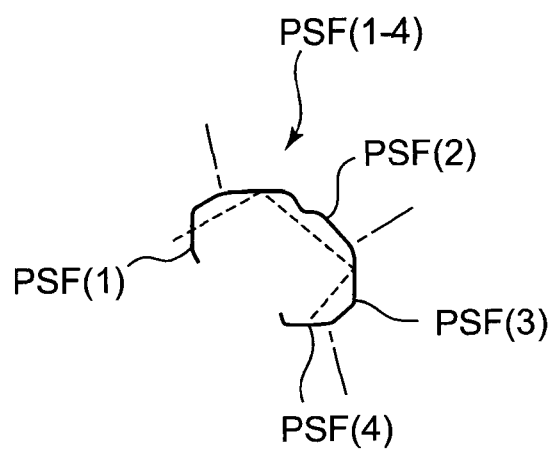
FIG. 8C is a conceptual diagram illustrating a PSF (Point Spread Function) of an entire frame.

FIG. 8C is a conceptual diagram schematically illustrating a new PSF (1-4). FIG. 8C is a diagram associated with FIGS. 8A and 8B and illustrating the motion vectors V(1) to (3) indicated by broken lines.

Then, after the PSF of the entire frame has been acquired, the CPU 8 carries out, for the pixel data of the two types of non-divided colors, a deconvolution process in which the acquired PSF is used as a two-dimensional convolution kernel (Step S316).

With this process, the CPU 8 reduces (corrects) motion blur induced by camera shake within the exposure time and generated in the pixel data of the two types of non-divided colors.

Thereafter, the CPU 8 combines the pixel data of the two types of non-divided colors, which has been subjected to the deconvolution process, with the added pixel data of the divided color stored in the RAM 13 as a result of the loop process of Steps S310 to S313 (Step S317).

Thus, the CPU 8 generates, in the RAM 13, pixel data including all RGB color components, i.e., Bayer pattern pixel data, and ends the image reconstruction process.

Figure 9:
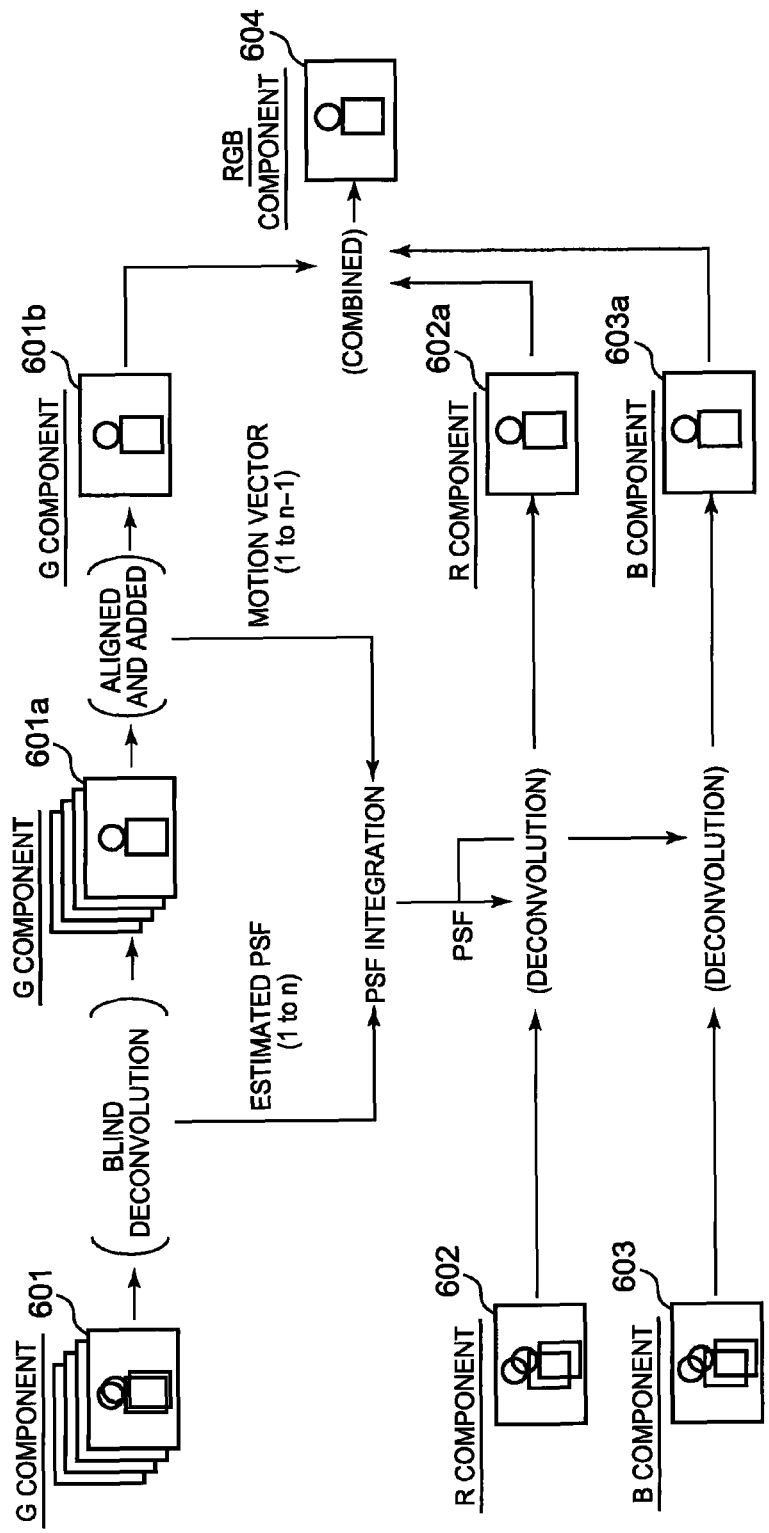
FIG. 9 is an explanatory diagram illustrating how the image reconstruction process is performed.

FIG. 9 is an explanatory diagram illustrating general outlines of the above-described image reconstruction process in an example where the divided color is "Green".

When the divided color is "Green" as illustrated in FIG. 9, motion blur, existing in each of a plurality of pieces of divided color pixel data 601 including only G components, is individually corrected by blind deconvolution.

Then, based on motion vectors detected for the second and subsequent divided color pixel data at divided time intervals, a plurality of pieces of new divided color pixel data 601a, which have been corrected, are added to a single piece of divided color pixel data 601b.

On the other hand, the PSFs, individually estimated in correcting the plurality of pieces of divided color pixel data 601 including only G components by using blind deconvolution, are integrated into an overall PSF indicative of a trace of motion blur within the exposure time based on the motion vectors obtained at divided time intervals.

Then, non-divided color pixel data 602 including only an R component and non-divided color pixel data 603 including only a B component are corrected so that the pixel data 602 and 603 become new non-divided color pixel data 602a and 603a, respectively, in which motion blur is reduced by deconvolution using the overall PSF.

Thereafter, the single piece of the divided color pixel data 601b on which the addition has been performed is combined with the new non-divided color pixel data 602a and 603a on which the correction has been performed, thus providing Bayer pattern pixel data 604 including all RGB color components.

Then, concurrently with the end of the above-described image reconstruction process, the CPU 8 returns the processing to the step in FIG. 2 and generates image data for recording (Step S14).

In the process of Step S14, the CPU 8 supplies, to the image processor 7, the Bayer pattern pixel data stored in the RAM 13 at this point, and allows the image processor 7 to perform various image processing on this pixel data.

Thereafter, the CPU 8 compresses the image data for recording by the CODEC 9, and stores, as a still image file, the compressed image data in the image memory 11 (Step S15).

As described above, when the camera shake correction mode is set as the image capture mode in the digital still camera 1 according to the present embodiment, the CPU 8 carries out the foregoing processes, thereby enabling reduction in camera-shake-induced motion blur generated in a captured image.

Besides, in the digital still camera 1, motion blur in each of a plurality of pieces of divided color pixel data is individually reduced by blind deconvolution, and then the plurality of pieces of divided color pixel data, which have been corrected, are aligned and added with high accuracy by using the motion vectors acquired based on the corrected pixel data.

Therefore, even when the amount of light for the object is insufficient and the exposure time at the time of image capture is long, i.e., even when the multi-shot exposure time is long, the eventually obtained divided color pixel data will be extremely favorable pixel data having no motion blur.

At the same time, in reducing motion blur in non-divided color pixel data by deconvolution, the PSF of the entire frame, into which the PSFs estimated by blind deconvolution for the respective pieces of divided color pixel data, is used as the PSF in the digital still camera 1.

Hence, motion blur in the non-divided color pixel data can be reliably reduced. This is because the PSF for each piece of the divided color pixel data serves as a PSF indicative of a trace of motion blur within a short period of time such as the multi-shot exposure time, and the PSF of the entire frame will be a relatively simple PSF (which is close to a straight line and indicative of a trace with high connectivity).

Thus, even when the amount of light for the object is insufficient and the exposure time at the time of image capture is long, the digital still camera 1 is capable of acquiring, as the eventual pixel data, extremely favorable pixel data having no motion blur. Consequently, the digital still camera 1 is capable of simultaneously realizing an improvement in image quality in a dark region, and high accuracy camera shake correction.

Further, in the present embodiment, the divided color is set to "Green" when the light source type determined at the time of image capture is a fluorescent lamp, and is set to "Red" when the light source type determined at the time of image capture is an electric lamp (incandescent lamp).

In other words, the divided color is set to a color that is dominant in a color distribution of the object.

Therefore, alignment can be carried out with higher accuracy at the time of addition of a plurality of pieces of pixel data acquired by multi-shot exposure; at the same time, non-divided color pixel data can be corrected (restored) with higher accuracy by using pixel data in which no motion blur is generated in the object represented by the pixel data.

As a result, irrespective of the color of the object, camera-shake-induced motion blur generated in a captured image can be reduced with stable accuracy.

Moreover, the process necessary for setting the divided color at the time of image capture can be simplified by setting the divided color based on color information (spectral distribution data) determined at the time of image capture and used in white balance control.

Note that in the present embodiment, the divided color is set to all RGB color components when the light source type determined at the time of image capture is sunlight, thus performing signal processing by a method similar to the conventional method of superimposing and combining continuously captured images.

However, the digital still camera 1 may be configured so that a method according to the present invention is carried out also when the light source type determined at the time of image capture is sunlight.

In that case, a particular color component determined in advance as the divided color may be set.

As a particular color component, for example, a G component in which the proportion of contribution of a brightness signal is high is conceivable.

Further, in the present embodiment, the digital still camera 1 in which no mechanical shutter is provided and an exposure time at the time of image capture is ensured by a so-called "electronic shutter" has been described.

However, although not illustrated, the digital still camera 1 may be provided with a mechanical shutter.

When a mechanical shutter is provided, the digital still camera 1 may be configured so that during a reading period of the multi-shot exposure described already above, for example, the shutter is closed and pixel signals of pixels of all color components of the image capturing device 3 are read.

Furthermore, in the present embodiment, the image capturing device 3, provided at its light-sensitive surface with the color filter for three types of pixel data of R, G and B components in a Bayer pattern, has been described.

However, the color filter provided at the light-sensitive surface of the image capturing device 3 may have a color pattern other than a Bayer pattern.

Alternatively, the color filter is not limited to a primary color filter pattern, but may be a complementary color filter pattern. Moreover, a modified Bayer pattern in which W (White), i.e., a transparent color with no color filter, is added to RGB may be provided.

Note that when the color filter has the modified Bayer pattern, W having the highest sensitivity is preferably set as the divided color (first color component), and each of R, G and B is preferably set as the non-divided color (second color component).

Further, in the present embodiment, the case where the image capturing device 3 is a single-plate CMOS sensor has been described.

However, as long as pixel signals can be read and reset (by using the shutter) independently for each color component, any image capturing device may be used in carrying out the present invention.

Note that a mode of reading pixel signals may be destructive reading as in the present embodiment, or may be non-destructive reading.

Accordingly, in carrying out the present invention, for example, an image capturing device such as a double-plate image sensor including two image capturing elements for G components and R and B components, a triple-plate image sensor including three image capturing elements for G components, R components and B components, or a triple-layer CMOS sensor (so-called "FOVEON CMOS sensor") may be used.

Furthermore, in the present embodiment, the foregoing image reconstruction process is performed by the CPU 8; however, for example, a dedicated signal processor may be provided inside the image processor 7 or at a preceding stage of the image processor 7, and the foregoing image reconstruction process may be performed by this signal processor.

Moreover, the present invention is not limited to a digital still camera described in the present embodiment. For example, the present invention may also be applicable to apparatuses such as a digital video camera, and a camera incorporated into any portable electronic equipment such as a mobile phone terminal.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

The invention claimed is:

1. An image capturing apparatus comprising:
   an image capturing unit configured to capture an image of an object;
   an image capture controller configured to:
   (i) cause the image capturing unit to capture a plurality of first color component images of the object by multi-shot exposure within a given exposure time at the time of image shooting, wherein each of the first color component images has a first color component; and
   (ii) causing the image capturing unit to capture a second color component image of the object and a third color component image of the object by a one-shot exposure within the given exposure time, wherein the second color component image and the third color component image have color components different from the first color component, respectively;
   a displacement information acquiring unit configured to:
   (i) set one of the first color component images as a reference image; and
   (ii) acquire displacement information of the object in the first color component images other than the reference image, with respect to the object in the reference image;
   an image adding unit configured to align and add the first color component images based on the displacement information so as to generate an added image;
   a calculator configured to calculate a first point spread function (PSF) based on the displacement information;
   a first correcting unit configured to correct the second and third color component images using the first point spread function; and
   a combining unit configured to combine the added image with the corrected second and third color component images.

2. The apparatus according to claim 1, further comprising:
   a second correcting unit configured to:
   (i) estimate second point spread functions (PSF) for the first color component images, wherein each of the second point spread functions represents a trace of motion blur induced by camera shake at the time of image shooting; and
   (ii) correct each of the first color component images using the second the point spread functions,
   wherein the calculator is configured to calculate a new first point spread function (PSF) for the second and third color component images, based on the displacement information and the second point spread functions, wherein the new first point spread function represents a trace of motion blur induced by camera shake at the time of the image shooting.

3. The apparatus according to claim 1, further comprising:
   a color information acquiring unit configured to acquire color information of the object; and
   a setting unit configured to select the first color component based on the color information,
   wherein each of the first color component images has the first color component selected by the setting unit.

4. The apparatus according to claim 3, further comprising:
   a determining unit configured to determine a type of a light source in an image shooting environment based on the color information,
   wherein the setting unit is configured to select the first color component in accordance with the type of the light source.

5. The apparatus according to claim 3, wherein the first color component is dominant in the color information of the object.

6. The apparatus according to claim 1, wherein the image capturing unit is a single-plate solid-state image sensing device comprising:
   a plurality of first photoelectric conversion elements each having the first color component;
   a plurality of second photoelectric conversion elements each having the second color component; and
   a plurality of third photoelectric conversion elements each having the third color component,
   wherein the image capture controller is configured to:
   (i) cause the plurality of first photoelectric conversion elements to capture the first color component images of the object by the multi-shot exposure within the given exposure time at the time of image shooting;
   (ii) cause the plurality of second photoelectric conversion elements to capture the second color component image of the object by the one-shot exposure within the given exposure time; and
   (iii) cause the plurality of third photoelectric conversion elements to capture the third color component image of the object by the one-shot exposure within the given exposure time.

7. A camera shake correction method comprising
(a) capturing an image of an object;
(b) capturing a plurality of first color component images of the object by multi-shot exposure within a given exposure time at the time of image shooting, wherein each of the first color component images has a first color component;
(c) capturing a second color component image of the object and a third color component image of the object by a one-shot exposure within the given exposure time, wherein the second and third color component images have color components different from the first color component, respectively;
(d) setting one of the first color component images as a reference image;
(e) acquiring displacement information of the object in the first color component images other than the reference image, with respect to the object in the reference image;
(f) aligning and adding the first color component images based on the displacement information so as to generate an added image;
(g) calculating a first point spread function (PSF) based on the displacement information;
(h) correcting the second and third color component images using the first point spread function; and
(i) combining the added image with the corrected second and third color component images.

8. A computer-readable medium storing a program for causing the computer to perform operations comprising:
(a) capturing an image of an object;
(b) capturing a plurality of first color component images of the object by multi-shot exposure within a given exposure time at the time of image shooting, wherein each of the first color component images has a first color component;
(c) capturing a second color component image of the object and a third color component image of the object by a one-shot exposure within the given exposure time, wherein the second and third color component images have color components different from the first color component, respectively;
(d) setting one of the first color component images as a reference image;
(e) acquiring displacement information of the object in the first color component images excluding the reference image, with respect to the object in the reference image;
(f) aligning and adding the first color component images based on the displacement information so as to generate an added image;
(g) calculating a first point spread function (PSF) based on the displacement information;
(h) correcting the second and third color component images using the first point spread function; and
(i) combining the added image with the corrected second and third color component images.

* * * * *

UNITED STATES PATENT AND TRADEMARK OFFICE
CERTIFICATE OF CORRECTION

PATENT NO. : 8,581,992 B2  
APPLICATION NO. : 13/107136  
DATED : November 12, 2013  
INVENTOR(S) : Akira Hamada Page 1 of 1

It is certified that error appears in the above-identified patent and that said Letters Patent is hereby corrected as shown below:

In the Claims

Column 19, line 28 (Claim 5, Line 1):

delete "A computer-readable medium" and insert --A non-transitory computer-readable medium--.

Signed and Sealed this
Second Day of September, 2014

Michelle K. Lee
*Deputy Director of the United States Patent and Trademark Office*